Figure 1:
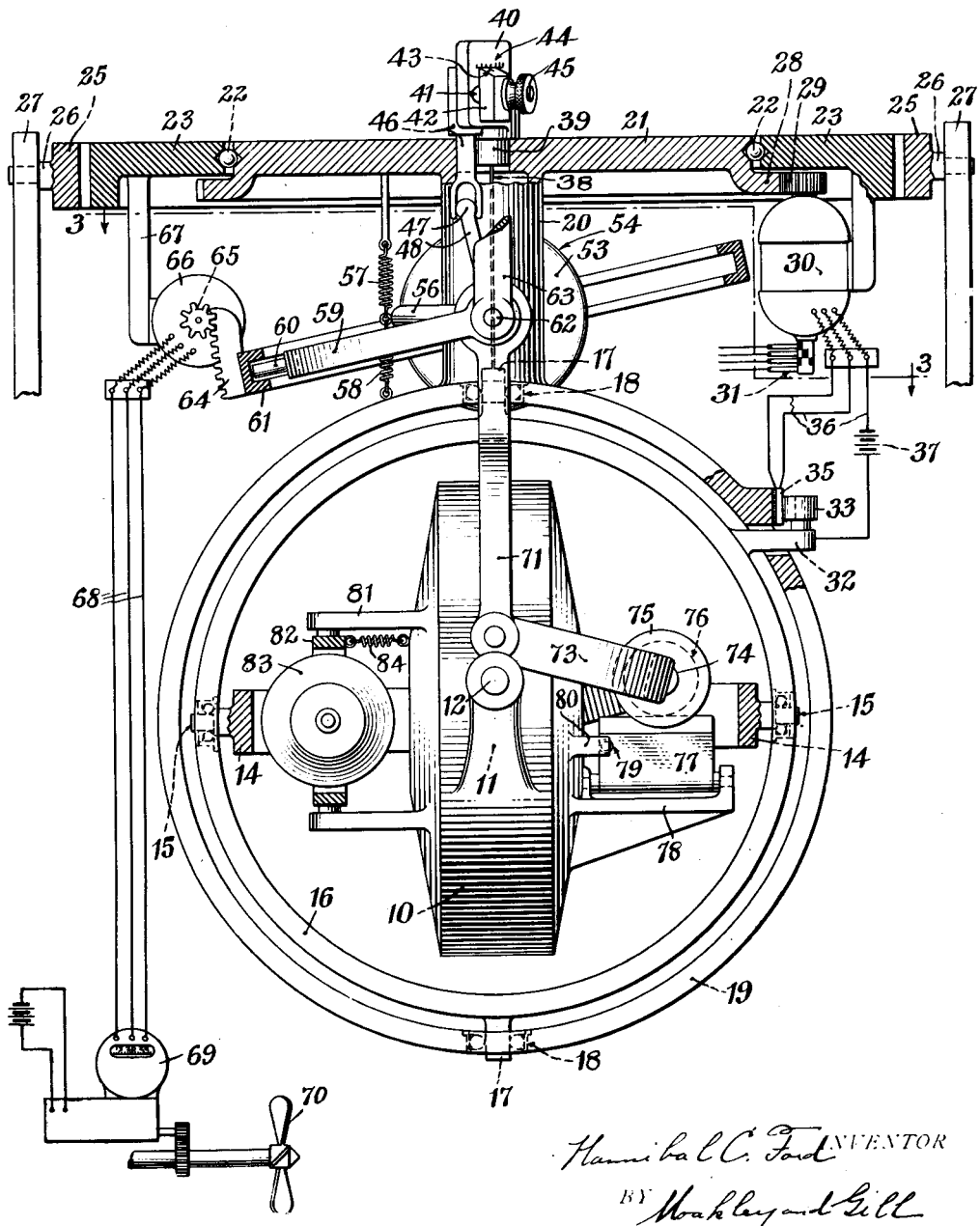

May 10, 1927.

H. C. FORD

GYROSCOPIC COMPASS

Filed Feb. 12, 1921

1,628,136

3 Sheets-Sheet 2

INVENTOR
Hannibal C. Ford
BY Moahley and Gill
ATTORNEYS.

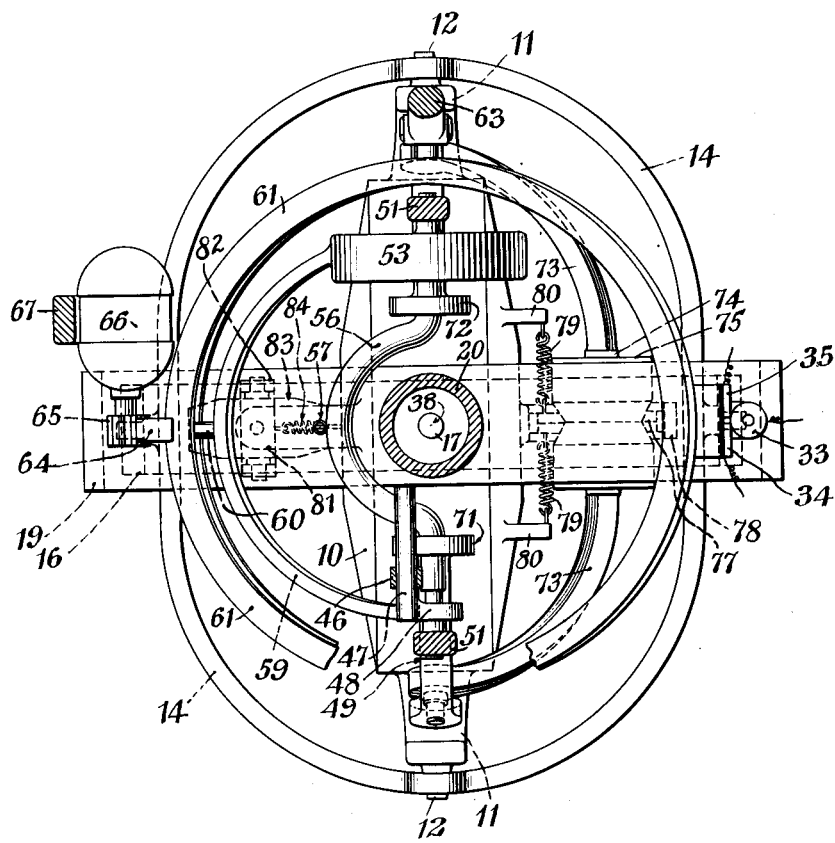

Patented May 10, 1927.

1,628,136

UNITED STATES PATENT OFFICE.

HANNIBAL C. FORD, OF JAMAICA, NEW YORK, ASSIGNOR TO FORD INSTRUMENT COMPANY, INC., A CORPORATION OF NEW YORK.

GYROSCOPIC COMPASS.

Application filed February 12, 1921. Serial No. 444,417.

This invention relates to gyroscopic compasses and particularly to a compass which will not deviate from the meridian due to meridional components of the movement of the craft upon which the compass is mounted.

In the case of an ordinary gyroscopic compass occupying a fixed position on the surface of the earth the axis about which the instrument as a whole moves is the polar axis of the earth, but if the compass be carried in a meridional direction over the earth's surface and the effect of the earth's rotation on the compass be disregarded, the axis about which the compass as a whole would move is one lying at right angles to the polar axis of the earth, and the rotor axis of the compass instead of lying in the meridian would point east and west. Under the combined effect of the rotation of the earth and the meridional movement of the compass, its rotor axis will therefore occupy a position lying at an angle to the meridian.

If the compass be mounted upon a craft moving east or west along a parallel of latitude, its velocity will be simply added to, or subtracted from, the linear velocity of the earth at that latitude, and the rotor axis of the gyroscope will point directly north and south. If the craft be moving in any other direction, the rotor axis will be displaced from the meridian by an amount depending upon the ratio of the north-south component of the craft's speed to the linear velocity of the earth at the latitude at which the craft is sailing, plus or minus the east-west component of the craft's speed according to whether the craft is moving east or west.

Changes in speed of the craft upon which the compass is mounted will produce deviations of the compass from its true position, for if the craft be moving along a meridian at an accelerating speed the effect upon the compass will be the same as if the craft were moving at constant speed along a curved path having progressively decreasing inclination to the meridian. Since the north-south component of the speed of the craft depends upon the course of the craft, changes in course will produce changes in this component, which will be accompanied by deviations of the compass while the course is being altered. Deviations of this character which occur during periods of change in course or speed are usually referred to as ballistic deflections, and are particularly objectionable during periods of quick changes in course of speed, as, for instance, during battle manoeuvres.

Various methods have been employed in connection with gyroscopic compasses for correcting for deviations due to meridional components of the craft's movement under varying conditions of speed and course. The readings may be corrected mathematically, by means of data obtained from suitable correction tables, or mechanically, by means of mechanism movable in proportion to the correction which should be applied. The arrangement commonly employed for this purpose is one in which the lubber's line is mounted upon a movable member which is shifted in accordance with the several factors which enter into the resulting correction, such as heading, speed and latitude.

When changes in the deviations of a gyroscopic compass occur on account of changes in the meridional component of the movement of the craft upon which the compass is carried, oscillations of the gyroscope are set up, and an appreciable time is required for the compass to reach its new settling point. At high latitudes the deviation of the compass resulting from such changes will be greater than at low latitudes on account of the lessened directive force of the compass as it is carried towards the poles. The rate of movement of the usual pendulous or pendulously controlled compass is, however, independent of latitude for a given rate of acceleration of the craft. Hence the time required for the compass to reach its new settling point after a change in the meridional component of the movement of the craft will be greater at high latitudes than at low latitudes, but the period of the compass cannot be conveniently altered in accordance with changes in latitude so that in practice the compass is designed for a particular latitude.

The correction mechanism is usually arranged to be moved simultaneously with changes in the north-south component of the craft's movement, but only at the particular latitude for which the compass is designed will the moving elements keep pace with the movement of this mechanism. At high latitudes the gyroscopic element will lag behind the mechanism, and not reach its final settling point until after the mechanism has assumed the position corresponding to the correction which should be applied. At lower latitudes the gyroscopic element will at first go beyond the position which it should occupy with relation to the correction mechanism and then gradually come back to its final settling point. The result of this is to give a considerable error in the indication of the compass, which persists for some time after any change in course or speed of the craft. These errors render the usual compass ineffective for use in naval fire control where it is desired to maintain a fixed reference point in azimuth while the craft is manoeuvring.

When a gyroscopic compass deviates from the meridian due to a north-south component of the movement of the craft, further errors are introduced into its readings by the effect of the acceleration forces upon the damping mechanism of the compass. All of these secondary errors, as they may be called to distinguish them from the primary errors due to the effect upon the compass of meridional components of the movement of the craft, are of a complex nature and little or no attempt has heretofore been made to compensate for them by mechanical means, while mathematical processes of correction are laborious and subject to errors in computations, particularly if performed under the stress of a naval engagement.

It is an object of this invention to overcome the disadvantages of prior compasses by preventing all deviation of the compass due to meridional components of the speed and acceleration of the craft upon which the compass is carried. The compass element is thus continuously maintained in its true position with respect to the meridian, the construction of the instrument is simplified by the omission of correction mechanism, and secondary errors are avoided, so that continuously correct readings may be obtained. Since the compass card occupies a correct position with respect to the cardinal points at all times, the instrument may be used as a pelorus for obtaining the bearings of distant objects or heavenly bodies, and the lubber's line may occupy a fixed relation to the craft instead of being movably mounted to permit it to be shifted in accordance with the correction which should be applied as in prior compasses.

Since no correcting mechanism for shifting the lubber's line is used the transmitter for controlling the actuation of repeater compasses may be connected directly to the servo motor of the power driven element instead of being driven from the combined motion of this element and a moving part of the correcting device as in prior compasses in which mechanical correction devices are employed.

In accordance with the invention, provision is made for preventing the ballistic deflections which occur during periods of change in course or speed as well as the deviations which result from the movement of the craft in other than an east-west direction. While the features of the invention which relate to the prevention of ballistic deflections are shown herein in a gyroscopic compass in conjunction with the features relating to the prevention of deviations due to north-south components of the speed of the craft, either of these features may be used to advantage in gyroscopic apparatus independently of the other, for taking care of the particular character of deviations to which they respectively relate.

For purpose of illustration, the invention will be described in detail herein in connection with a gyroscopic compass of the type in which the rotor casing is mounted upon a horizontal axis within a member which is mounted to turn about a vertical axis, as by being suspended from a follow-up element by a wire. In compasses of this type, the switch for controlling the motor which drives the follow-up element usually consists of a movable contact, such as a roller, mounted upon the member which carries the rotor casing, and adapted to cooperate with a pair of fixed contacts mounted upon a member connected to the follow-up element, the arrangement being such that upon relative movement in azimuth between the gyroscope and the craft due to a change in course, the movable contact will engage one or the other of the fixed contacts to energize the motor and cause the follow-up element to move with the gyroscopic element with respect to the lubber's line to indicate the new course.

In accordance with this invention movement of the follow-up element due to the effect upon the gyroscope of meridional components of the movement of the craft is prevented by applying a torque about the vertical supporting axis, as by putting the suspension wire under torsion, to cause the gyroscope to precess about its horizontal supporting axis at a rate equal to the meridional component of the angular velocity of the craft over the surface of the earth. Under these conditions there will be no movement of the gyroscope about its vertical axis, and the movable contact will occupy its neutral position with respect to the fixed contacts to render the motor ineffective, thus preventing erroneous displacement of the follow-up element and the compass card carried thereon.

The amount of torsion applied to the suspension wire may be controlled in accordance with the meridional component of the course of the craft by means of a cam member carried upon the supporting frame of the instrument and which is also arranged so that its inclination may be changed in proportion to the speed of the craft. Co-operating with the cam member is a member which partakes of the movement of the follow-up element from which the gyroscopic element is suspended, and which is so constructed that when the craft is moving directly east or west no torsion will be applied to the suspension wire, but if the craft be heading in any other direction a slight twist will be imparted to the suspension wire, which will apply a torque about the vertical axis of the gyroscope of the proper magnitude to cause the gyroscope to precess about its horizontal axis at an angular velocity equal to that of the north-south component of the angular velocity of the craft.

In order to prevent ballistic deviations of the compass during the time when the course of the craft or its speed is changing there is provided means by which the acceleration along a given line of direction may be determined and means for applying about the horizontal supporting axis of the gyroscope a torque which is proportional to the acceleration for counteracting the torque due to such changes.

In the form of apparatus described herein, the member which cooperates with the cam member is utilized for actuating a device having a part which is movable in accordance with the acceleration of the member, and thus serves to determine the acceleration of the craft along a given line of direction. Mounted upon the gyroscopic element is a movable mass which is connected to the part for determining acceleration in such a manner that as the part moves the mass will be shifted to produce a torque about the horizontal supporting axis of the gyroscope to counterbalance the ballistic torque due to the acceleration of the craft. This counterbalancing torque will be applied only so long as there is any ballistic torque due to changes in course of speed, and as soon as such changes have ceased the mass will have been restored to normal position. By this arrangement the tendency of the gyroscope to precess about its vertical axis during the periods of change in course or speed is counteracted, so that no deviations of the compass occur during these periods.

The movable mass by which compensation may be obtained during periods in which the course or speed of the craft is changing is also so mounted that when the compass is seeking the meridian, at which time the rotor axis of the gyroscope will be inclined from a horizontal position, a torque will be applied about the vertical axis, which will damp the oscillations of the compass about the meridian.

The main gyroscope is preferably provided with a small stabilizing gyroscope for preventing oscillations of its pendulous mass in the plane of its rotor. For the purpose of supporting the stabilizing gyroscope upon the main gyroscope the casing of the latter is provided with brackets extending from one side thereof. A frame is mounted in the brackets to swing about an axis parallel to the plane of the rotor of the main gyroscope, and the auxiliary gyroscope is mounted in the frame with the plane of its rotor perpendicular to the plane of the rotor of the main gyroscope. The frame is connected to the casing of the main gyroscope by a resilient member, such as a spring.

Figure 2:
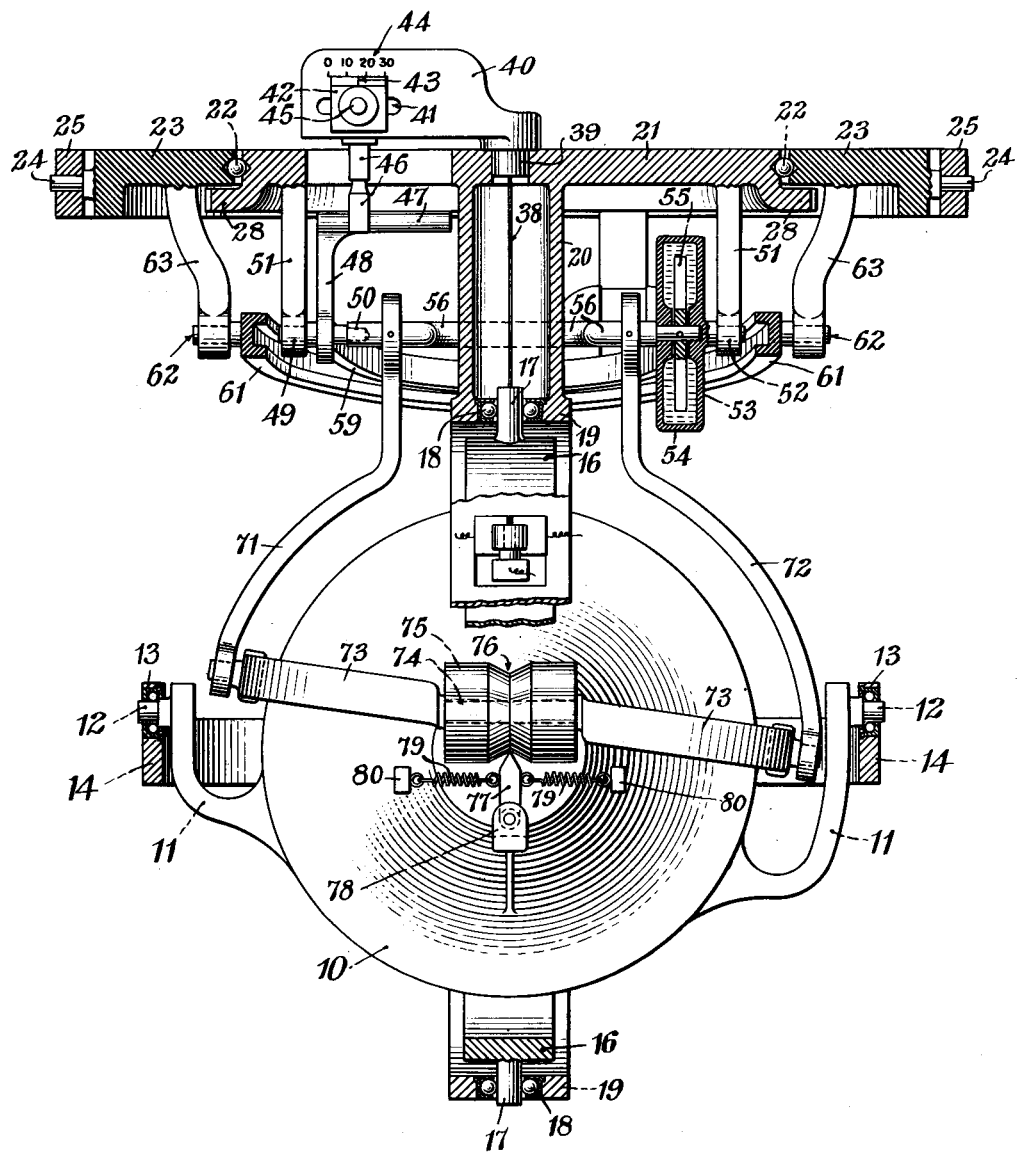

The particular nature of the invention as well as other objects and advantages thereof will appear more clearly from a description of a preferred embodiment as illustrated in the accompanying drawings in which, Fig. 1 is an elevational view of the west side of the compass showing the relation of the parts when the craft upon which the compass is mounted is heading north, and with certain of the elements shown in section and others shown diagrammatically, Fig. 2 is an elevation of the south end of the compass with certain parts shown in section, and Fig. 3 is a sectional plan view of the compass along the line 3—3 of Fig. 1.

Referring to the drawings, in which similar reference characters denote similar parts throughout the several views, 10 indicates a casing within which the rotary element of the gyroscope is mounted and which, since it may be of any preferred construction, is not shown in detail herein. The casing is provided with lugs 11 each of which is provided at its upper end with a trunnion 12 mounted in a suitable bearing in an extension 13 of an oblong frame 14, the arrangement being such that the center of gravity of the gyroscope lies below the horizontal axis passing through the trunnions 12—12. The frame 14 is provided with trunnions 15, preferably extending in alignment with the rotor axis of the gyroscope, as shown most clearly in Fig. 1, and mounted in suitable bearings in a vertical ring 16 which is provided with trunnions 17 mounted in ball bearings 18 at the top and bottom of a second vertical ring 19. The ring 19 is formed integrally with, or otherwise attached to, a tubular support 20 depending from a circular follow-up member 21 carrying a compass card and which, by means of a ball bearing 22, is mounted upon a supporting frame 23 which may be provided with a lubber's line adapted to cooperate with the compass card. This frame is provided with trunnions 24 mounted in a gimbal ring 25 which, in turn, is provided with trunnions 26 mounted in suitable supports 27 adapted to be attached to the craft upon which the compass is to be carried.

Member 21 is provided with a projecting portion 28 lying below the frame 23 and having a toothed periphery engaged by a pinion 29 on the shaft of a follow-up motor 30 carried by a bracket depending from the frame 23. The shaft of the motor also carries a suitable transmitter 31 for controlling the actuation of repeater compasses of any preferred construction, which have been omitted from the drawing for the sake of simplicity. The motor is for the purpose of imparting to the follow-up member 21 movements corresponding to those of the gyroscope in accordance with the usual construction of gyroscopic compasses. In the arrangement here shown the ring 16 is provided with an arm 32 projecting through a slot in the outer ring 19 and carrying at its outer end a roller 33 adapted to cooperate with contacts 34 and 35 mounted upon the outer ring 19 and insulated therefrom and from each other. The roller 33 and contacts 34 and 35 are connected to the motor 30 by a three wire system 36, current for which is supplied by a battery or other source of electricity 37.

The gyroscope and the rings 14 and 16 upon which it is mounted are suspended from the member 21 by means of a wire 38 attached at its lower end to the upper trunnion 17 of the ring 16 and at its upper end to a member 39 rotatably mounted in a bearing in the plate. Connected to the member 39 is an arm 40 provided with a slot 41 and on one side of which is a block 42 having an index line 43 cooperating with a scale 44 on the arm. A screw 45, provided with a clamping nut at its end, passes through the block 42 and slot 41 and is connected, on the other side of the arm to a depending, forked member 46 passing through a slot in the member 21 and engaging a horizontal member 47 projecting from the upper end of an arm 48 provided with bearing pins 49 and 50, the former of which is mounted within the lower end of a bracket 51 extending downwardly from the member 21. A corresponding bracket 51 extends downwardly from this member on the other side of the central tubular member 20 and serves as a support for a pin 52 to which is attached the outer casing 53 of a torque-applying device 54, the inner member 55 of which is attached to one end of a curved member 56, which extends through a bearing in casing 53. The other end of the member is supported upon the bearing pin 50 as shown most clearly in Figs. 2 and 3. The casing 53 is filled with a suitable viscous fluid as indicated in Fig. 2. The curved member 56 is held in normal or central position by opposing springs 57 and 58, the former being attached to the lower face of member 21 and the latter to the top of the outer ring 19.

A semicircular member or arm 59 is connected at one end to the arm 48, and at the other end to the casing 53 of the torque-applying device 54. The arm 59 is provided with a pin 60 disposed at right angles to the horizontal axis about which the arm swings. The pin 60 fits within the groove of a cam ring 61 provided at diametrically opposite points with trunnions 62—62 mounted in suitable bearings at the lower ends of brackets 63 depending from the frame 23 as is shown most clearly in Fig. 2. The brackets 63 are so arranged that the axis through the trunnions 62—62 lies in the same vertical plane as does the horizontal trunnion axis 12—12. At a point substantially 90° from the trunnions 62—62 the cam ring 61 is provided with a segmental gear 64 meshing with a pinion 65 on the shaft of a small motor 66 mounted on a bracket 67 depending from the frame 23. The motor 66 is connected by means of a three wire system 68 to an instrument 69 movable in accordance with the speed of the craft and preferably driven from the propeller 70. This arrangement is for the purpose of tilting the cam ring in accordance with the speed of the craft, and since the particular means employed for this purpose may be of any suitable construction they have been indicated only diagrammatically in the drawings.

The curved member 56 is provided at its ends with straight portions to which are rigidly attached arms 71 and 72 having a curvature corresponding substantially to that of the gyroscope casing 10 and terminating respectively above and below the trunnion axis 12—12 as shown most clearly in Fig. 2. Between the free ends of the arms 71 and 72 there is connected a curved bar 73 having a straight, cylindrical, central portion 74 upon which is mounted a weight 75 having a groove 76 adapted to receive the upper edge of a flat arm 77 upon which the weight rests. The arm is mounted upon a bracket 78 extending prependicularly to one face of the rotor casing 10, and is connected by means of springs 79 to lugs 80 projecting from the rotor casing.

The opposite side of the rotor casing is provided with a pair of brackets 81 between which is pivotally mounted a frame 82 containing a small stabilizing gyroscope 83 having its rotor axis horizontal and at right angles to the rotor axis of the main gyroscope. A spring 84 is connected between the frame 82 and the casing 10.

In considering the operation of the instrument described above, it will be understood that by virtue of the follow-up motor 30 the member 21 carrying the compass card will be moved relatively to the frame 23 upon which the lubber's line is placed, in accordance with the relative movement in azimuth of the gyroscope and ship as in the usual operation of instruments of this character. In the construction shown herein the arm 59 and pin 60 move with the gyroscope and the member 21, while the cam ring 61 is fixed with respect to the craft upon which the instrument is mounted, except for tilting movements which may be imparted to it by the motor 65. The arrangement is such that when the craft is heading due east or west the pin 60 will occupy a position in alinement with the axis through the trunnions 62—62 by which the cam ring 61 is supported. The cam ring 61 will be tilted in accordance with the speed of the craft, but this will have no effect upon the arm 59 for an east-west heading. Under these conditions, therefore, the arm 40 which is connected to the suspension wire 38 will occupy its normal position and no torsion will be applied to the wire.

If the course of the craft be changed there will be a relative movement between the gyroscope and the follow-up element 21 controlled thereby, on the one hand, and the frame 23 and the parts associated therewith, on the other hand. As a result of this relative movement of the parts the pin 60 will move through the groove in the cam ring 61 and tilt the arm 59 about the axis passing through the ends of the arm. The parts are so designed that the arm will be tilted in proportion to the cosine of the heading of the craft, since it is upon this function that the north-south component of the heading depends. The amount by which the arm 59 will be tilted depends also upon a function of the speed of the craft, since the cam ring 61 will be tilted about its axis 62—62 by motor 66 in accordance with the speed of the craft.

As a result of the movements imparted to the arm 59 it will take up a position corresponding to the cosine of the heading of the craft multiplied by its speed, and if either or both of these factors of the movement of the craft be changed there will be a corresponding change in the position of the arm. The movement imparted to the arm will be accompanied by a corresponding movement of the arm 48 which will, through the forked member 46, swing the arm 40 to produce torsion in the suspension wire 38, thus applying a torque about the vertical axis of the gyroscope which will cause the latter to precess about its horizontal trunnion axis 12—12. The various elements of the apparatus are so constructed and proportioned that the rate of precession of the gyroscope will be equal to the north-south component of the angular velocity of the craft over the surface of the earth. The rotor axis of the gyroscope will therefore remain parallel to the surface of the earth and in the plane of the meridian, and the roller 33 will occupy its normal position with respect to contacts 34 and 35 maintaining the circuit of motor 30 open. The follow-up element 21 will therefore not be displaced, and a true indication of the bearing of the craft will be given by the compass without necessity for applying corrections such as are required in the case of gyroscopic compasses heretofore constructed which are subject to deviations due to meridional components of the movement of the craft.

In accordance with the invention the movement of the arm 59 is also utilized for controlling the position of the weight 75 to counteract the ballistic torque produced about the trunnion axis 12—12 during changes in course or speed of the craft. Since the parts of the apparatus are so designed that the movement imparted to the arm 59 is proportional to the cosine of the compass heading of the craft multiplied by its speed, a corresponding movement will be imparted to the casing 53 of the torque applying device. The inner member 55 of this device and the arms 71 and 72 connected therewith will thus be displaced in accordance with the north-south component of the acceleration of the craft and may be used for determining such acceleration.

The displacement of the arms 71 and 72 will shift the weight 75 from the position it occupies when the gyroscope is in equilibrium to a position which will cause it to produce a torque about the trunnion axis 12—12 of the proper magnitude to compensate for the ballistic torque about this axis due to changes in course or speed. The compensating torque applied by the weight will vary in accordance with the north-south acceleration and will be applied only during periods of change of course or speed. When the craft takes up its new course or speed and the acceleration becomes zero, there will be no further movement of the arm 59 and the centering springs 57 and 58 will have restored the curved member 56 and the inner member 55 of the torque applying device to their normal position. Through the arms 71 and 72 the weight 75 will have been brought back to the position it occupies when the gyroscope is in equilibrium. The arm 59, however, will continue to occupy the position to which it has been displaced by the change in course or speed and will, therefore, keep the suspension wire 38 under torsion so that there will be no deviation of the compass due to the meridonal component of the new course or speed.

By providing an adjustable connection between the arm 40 and the forked member 46 the amount of torsion applied to the suspension wire 38 for any given movement of the arm 59 may be altered to take care of changes in the properties of the suspension wire during usage, different speeds of the rotor of the gyroscope, or for any other reason.

Whenever the compass is seeking the meridian the rotor axis of the gyroscope will be inclined from a horizontal position, and by means of the arm 77 carried upon the rotor casing the weight 75 resting thereon will be raised or lowered independently of the arms 71 and 72, due to the pivotal connection between the member 73 and the lower ends of these arms. On account of the inclination of the member 73 and the groove 76 in the weight 75, the movement of the weight by the arm 77 will be accompanied by a displacement of the arm from its normal position, with the result that a torque will be applied to the gyroscope by means of one or the other of the springs 79. Since this torque will be applied about the vertical axis of the gyroscope, it will cause a precession of the gyroscope about its horizontal axis and thus tend to damp out the oscillations of the compass about the meridian.

The stabilizing gyroscope 83 will prevent oscillations of the main gyroscope and casing about the horizontal supporting axis 15—15 and eliminate deviation which would otherwise occur due to intercardinal swinging of its pendulous mass caused by rolling and pitching of the craft.

The indications of the compass may be transmitted to any number of suitable repeater compasses by means of the transmitter 31, and since the readings of the main compass are not subject to deviation due to the effects of meridional components of the ship's movement, the necessity for applying corrections to the readings of the repeater compasses will be eliminated.

By connecting the transmitter directly to the motor 30, the use of special reduction gears for connecting it to the follow-up member 21 is avoided, thereby simplifying the construction of the instrument and eliminating the possibility of errors due to the lost motion in such gears.

While a preferred embodiment of the invention has been shown and described, it will be understood that it may be embodied in other forms of gyroscopic compasses and that various changes in the details of construction of the elements of the instruments may be made without departing from the principle of the invention as defined in the appended claims.

I claim:

1. The method of preventing deviations of a gyroscopic compass having a gyroscopic element mounted upon a supporting structure to turn about mutually perpendicular axes, due to the effect on the element of the movement over the surface of the earth of the craft on which the compass is mounted, which method consists in applying about the axis of the gyroscopic element about which such deviations occur a torque of such value as to cause the element to precess about the other axis at a rate equal to the meridional component of the angular velocity of the craft over the surface of the earth.

2. The method of preventing deviations of a gyroscopic compass having a gyroscopic element mounted upon a supporting structure to turn about mutually perpendicular axes, due to the effect on the element of the movement over the surface of the earth of the craft on which the compass is mounted, which method consists in applying about the axis of the gyroscopic element about which such deviations occur a torque of such value as to cause the element to precess about the other axis at a rate equal to the meridional component of the angular velocity of the craft over the surface of the earth and applying a torque about the last named axis of such value as to compensate the torque about this axis caused by the effect on the gyroscopic element of changes in the movement of the craft over the surface of the earth.

3. The method of preventing deviations of a gyroscopic compass having a gyroscopic element mounted upon a supporting structure by vertical and horizontal axes, due to the effect on the element of the movement over the surface of the earth of the craft on which the compass is mounted, which consists in applying about the vertical axis of the gyroscopic element a torque of such value as to cause the element to precess about the horizontal axis at a rate equal to the meridional component of the angular velocity of the craft over the surface of the earth.

4. The method of preventing deviations of a gyroscopic compass having a gyroscopic element mounted upon a supporting structure to turn about mutually perpendicular axes, due to the effect on the element of the movement over the surface of the earth of the craft on which the compass is mounted, which method consists in applying about the axis of the element about which such deviations occur an artificial torque having a component proportional to a function of the speed of the craft and a component proportional to a function of the course of the craft to cause the element to precess about the other axis at a rate equal to the meridional component of the angular velocity of the craft over the surface of the earth.

5. In gyroscopic apparatus for use on a moving craft, the combination of a gyroscope having supporting axes, and means for applying a torque to one of the supporting axes of the gyroscope proportional to functions of the course and speed of the craft.

6. In gyroscopic apparatus for use on a moving craft, the combination of a gyroscope having horizontal and vertical supporting axes, and means for applying a torque to the vertical supporting axes of the gyroscope proportional to functions of the course and speed of the craft.

7. In gyroscopic apparatus for use on a moving craft, the combination of a gyroscope mounted upon mutually perpendicular axes, and means whereby a torque may be applied about one of the axes to cause the gyroscope to precess about the other axis at a rate equal to the meridional component of the angular velocity of the craft.

8. In gyroscopic apparatus for use on a moving craft, the combination of a gyroscope, an element responsive to the meridional component of the movement of the craft, an element responsive to the acceleration of the craft and means whereby said elements affect the gyroscope in accordance with their responsiveness.

9. In gyroscopic apparatus for use on a moving craft, the combination of a gyroscope mounted upon vertical and horizontal axes and means whereby a torque may be applied to the gyroscope about the vertical axis to cause the gyroscope to precess about the horizontal axis at a rate equal to the meridional component of the angular velocity of the craft.

10. In gyroscopic apparatus for use on a moving craft, the combination of a gyroscope mounted upon horizontal and vertical axes, a suspension for the gyroscope connected to the vertical axis and means whereby the suspension may be put under torsion to apply a torque about the vertical axis to cause the gyroscope to precess about the horizontal axis at a rate equal to the meridional component of the angular velocity of the craft.

11. In a meridian seeking gyroscopic compass, the combination of a gyroscope having supporting axes, means for applying a torque about one of the supporting axes of the gyroscope to prevent deviation from the meridian due to a meridional component of the movement of the craft upon which the compass is carried, and means dependent upon the magnitude of the meridional component for determining the amount of torque.

12. In a gyroscopic compass for use on a moving craft and provided with a gyroscope mounted upon mutually perpendicular axes, the combination of means for applying to the gyroscope about one of the axes a torque which varies as the cosine of the heading of the craft and a function of the speed of the craft.

13. In a meridian seeking gyroscopic compass for use on a moving craft and including a gyroscopic element, a follow-up element and a support therefor adapted to be attached to the craft, the combination of a cam member movably mounted on the support, an arm associated with the gyroscopic and follow-up elements and operatively related to the cam member, and means whereby the movement of the cam member causes the arm to produce a torque on the gyroscope.

14. In a meridian seeking gyroscopic compass for use on a moving craft and including a gyroscopic element, a follow-up element and a support therefor adapted to be attached to the craft, the combination of a cam member movably mounted on the support, means for shifting the cam member in accordance with the speed of the craft, an arm associated with the gyroscopic and follow-up elements and operatively related to the cam member, and means whereby movement of the cam member causes the arm to produce a torque on the gyroscope.

15. In a meridian seeking gyroscopic compass for use on a moving craft, a movable member capable of being displaced proportionately to functions of the course and speed of the craft, means actuated by the member and movable in accordance with the acceleration produced by changes in course and speed of the craft and a gyroscope affected jointly by said member and said means.

16. In a meridian seeking gyroscopic compass for use on a moving craft and including a gyroscope having means for orientation normally responsive to north - south movement of the craft and to the earth's rotation, the combination of a cam member adapted to be displaced in accordance with changes in course or speed of the craft, an arm co-acting with the cam member, a mass movably mounted with respect to the gyroscope, and means actuated by the arm for displacing the mass while the cam member is undergoing changes in position to compensate for the effect upon the gyroscope of changes in course or speed of the craft.

17. Gyroscopic apparatus for use on a moving craft, comprising a pendulous gyroscopic element, a mass movably mounted on the element, and means for shifting the mass to prevent ballistic deflection of the element by changes in course or speed of the craft.

18. Gryoscopic apparatus for use on a moving craft, comprising a pendulous gyroscopic element, a mass movably mounted on the element, and means for shifting the mass in accordance with the acceleration due to changes in course or speed of the craft to prevent ballistic deviation of the element due to such changes.

19. In a compass for use on a moving craft a pendulous gyroscope mounted on a horizontal axis, and means to counterbalance the torque produced about said axis by changes in velocity or direction of the craft, said means comprising a movable member, means for moving said member toward or from the horizontal axis, a mechanism adjusted to the speed of the craft and means connecting said last named means to the mechanism.

20. In a gyroscopic compass, a gyroscope having supporting axes, and means for damping the oscillations of the gyroscope about the meridian, including a mass which shifts as the gyroscope shifts in its oscillations in seeking the meridian to cause a torque about one of the supporting axes of the gyroscope in opposition to that caused by such oscillations.

21. In a gyroscopic compass, a gyroscope having supporting axes, means for damping the oscillations of the gyroscope about the meridian, including a mass which shifts as the gyroscope shifts in its oscillations in seeking the meridian to cause a torque about one of the supporting axes of the gyroscope in opposition to that caused by such oscillations and means for controlling the mass in accordance with changes in speed of the craft upon which the compass is mounted.

22. In a meridian seeking gyroscopic compass for use on a moving craft and including a gyroscope having means for orientation normally responsive to north-south movement of the craft and to the earth's rotation, the combination of a cam member adapted to be displaced in accordance with changes in course or speed of the craft, an arm co-acting with the cam member, a mass movably mounted with respect to the gyroscope and normally ineffective thereon, and a viscous fluid device having a part connected to the arm and a part connected to the mass for displacing the mass while the cam member is undergoing changes in position to compensate for the effect upon the gyroscope of changes in speed of the craft.

23. In a meridian seeking gyroscopic compass for use on a moving craft and including a gyroscope having means for orientation normally responsive to north-south movement of the craft and to the earth's rotation, the combination of a cam member adapted to be displaced in accordance with changes in course or speed of the craft, an arm co-acting with the cam member, an arm movably mounted on the gyroscope, a connection between each side of the arm and the gyroscope, a mass resting upon the arm, and a viscous fluid device having a part connected to the arm which co-acts with the cam member and a part connected to the mass for displacing the mass while the cam member is undergoing changes in position to compensate for the effect upon the gyroscope of changes in course or speed of the craft said mass being so mounted that tilting of the gyroscope causes displacement of the arm upon which the mass rests to exert a torque upon the gyroscope through one of the connections between the said arm and the gyroscope.

24. In a meridian seeking gyroscopic compass for use on a moving craft and including a gyroscope having means for orientation normally responsive to north-south movement of the craft and to the earth's rotation, the combination of a cam member adapted to be displaced in accordance with changes in course or speed of the craft, an arm co-acting with the cam member, a mass movably mounted on the said gyroscope and normally in equilibrium therewith, and means actuated by the arm for displacing the mass while the cam member is undergoing changes in position to compensate for the effect upon the gyroscope of changes in course or speed of the craft.

25. In a meridian seeking gyroscopic compass for use on a moving craft and including a gyroscope having means for orientation normally responsive to north-south movement of the craft and to the earth's rotation, the combination of a cam member adapted to be displaced in accordance with changes in course or speed of the craft, an arm co-acting with the cam member, a viscous fluid device having two parts movable relatively to each other, one of said parts being connected to the arm, a member to which the other part is connected, a pair of arms connected to the member, a supporting member connected between the free ends of said arms and disposed at an angle to the horizontal supporting axis of the gyroscope, a mass mounted upon the supporting member, an arm attached to the gyroscope and upon which the mass rests, and connections between the arm and the gyroscope whereby tilting of the gyroscope causes displacement of the arm upon which the mass rests with respect to the gyroscope, and changes in position of the cam member cause movement of the mass upon the arm on which it rests without producing movement of such arm with respect to the gyroscope.

26. In a meridian seeking gyroscopic compass for use on a moving craft and including a gyroscopic element, a follow-up element and a support therefor adapted to be attached to the craft, the combination of a member movably mounted on the support, means co-acting with the member and mounted to move with the gyroscopic and follow-up elements, a normally ineffective torque producing device associated with the gyroscopic element, and means operatively connected with the first named means and the torque producing device whereby displacement of the gyroscopic and follow-up elements with respect to the support causes said device to produce a torque on the gyroscopic element while such displacement is occurring.

27. In a meridian seeking gyroscopic compass for use on a moving craft and including a gyroscopic element, a follow-up element and a support therefor adapted to be attached to the craft, the combination of a cam member movably mounted on the support, means co-acting with the cam member and mounted to move with the gyroscopic and follow-up elements, means under the control of the means co-acting with the cam member for producing a torque about one of the axes of the gyroscopic element when this element and the follow-up element are displaced with respect to the support, a normally ineffective means for producing a torque about the other axis of the gyroscopic element, and means operatively connected with the means co-acting with the cam member for rendering the last named torque producing means effective while such displacement is occurring.

28. In a meridian seeking gyroscopic compass for use on a moving craft and including a gyroscopic element, a follow-up element and a support therefor adapted to be attached to the craft, the combination of a cam member movably mounted on the support, means co-acting with the cam member and mounted to move with the gyroscopic and follow-up elements, means under the control of the means co-acting with the cam member for producing a torque about the vertical axis of the gyroscopic element when this element and the follow-up element are displaced with respect to the support, a mass movably mounted on the gyroscopic element, means operatively connected with the means co-acting with the cam member for moving the mass to produce a counterbalancing torque about the horizontal axis of the gyroscopic element while such displacement is occurring, said means being adapted to permit the mass to resume its normal position after the elements have taken up a new position with respect to the support, while maintaining the torque about the vertical axis.

29. In gyroscopic apparatus for use on a moving craft, the combination of a gyroscopic element, a power-driven element on which the gyroscopic element is mounted, and means for preventing movement of the power-driven element due to the effect upon the gyroscopic element of north-south components of the course and speed of the craft.

30. In gyroscopic apparatus for use on a moving craft, the combination of a gyroscopic element, a power-driven element on which the gyroscopic element is mounted, a motor for actuating the power-driven element, and a transmitter connected directly to the motor and adapted to control a repeater.

31. In gyroscopic apparatus for use on a moving craft, the combination of a gyroscopic element, a power-driven element on which the gyroscopic element is mounted, means for driving the power-driven element, means associated with the gyroscopic element for controlling the driving means and the power-driven element and means controlled by the position of the power-driven element for applying a torque to the gyroscopic element to prevent actuation of the controlling means due to the effect upon the gyroscopic element of north-south components of the movement of the craft.

32. In gyroscopic apparatus for use on a moving craft, the combination of a gyroscopic element, a power-driven element on which the gyroscopic element is mounted, a motor for actuating the power-driven element, means for controlling the motor comprising a part associated with the power-driven element and a part associated with the gyroscopic element, said parts being adapted to be displaced with respect to each other to cause actuation of the motor upon relative movement of the gyroscopic element with respect to the craft, and means controlled by the position of the power-driven element for applying a torque to the gyroscopic element to prevent relative displacement of the parts due to the effect upon the gyroscopic element of meridional components of the movement of the craft.

33. In a gyroscope comprising a rotor, a casing therefor and a support for the casing, the combination of a frame movably mounted upon the casing upon an axis parallel to the plane of the rotor, and an auxiliary gyroscope mounted in the frame with the plane of its rotor at right angles to the plane of the first named rotor.

34. In a gyroscope comprising a rotor, a casing therefor and a support for the casing, the combination of a frame movably mounted upon the casing upon an axis parallel to the plane of the rotor, an auxiliary gyroscope mounted in the frame with the plane of its rotor at right angles to the plane of the first named rotor, and resilient means connected between the casing and the frame.

35. In a gyroscopic compass the combination of a rotor, a casing therefor, a bracket projecting from one side of the casing, a member movably mounted on the bracket and adapted to swing about an axis perpendicular to the plane of the rotor, a mass resting upon the member, and means for holding the mass upon the member to permit relative movement of the mass and member with respect to the casing.

36. In a gyroscopic compass, the combination of a rotor, a casing therefor, a bracket projecting from one side of the casing, a member movably mounted on the bracket and adapted to swing about an axis perpendicular to the plane of the rotor, a resilient connection between the member and the casing, a mass resting upon the member, and means for holding the mass upon the member to permit relative movement of the mass and member with respect to the casing.

37. In navigation apparatus consisting of a gyroscopic element and a power-driven element bearing a course indicator and upon which the gyroscopic element is mounted, the combination of means provided with a lubber's line bearing a fixed relation to the craft and adapted to cooperate with the indicator and means controlled by the position of the power-driven element for applying a torque to the gyroscopic element to prevent erroneous displacement of the indicator with respect to the lubber's line due to the effect upon the gyroscope of meridional components of the movement of the craft carrying the apparatus.

38. In gyroscopic navigational apparatus, the combination of a gyroscopic element, means responsive to the acceleration of a craft along a given line of direction, and means operatively related to said first-named means for applying to the gyroscopic element a torque proportional to the acceleration for counteracting the torque due to changes in course or speed of the craft.

39. Gyroscopic apparatus for use on a moving craft, comprising a gyroscopic element having supporting axes and pendulous with respect to one of them, and means for applying a compensating torque about the said axis of the element to prevent deviation of the element due to the effect on the element of the movement over the surface of the earth of the craft on which the compass is mounted.

In testimony whereof I affix my signature.

HANNIBAL C. FORD.